United States Patent [19]
Fujimoto

[11] Patent Number: 6,089,109
[45] Date of Patent: Jul. 18, 2000

[54] ANGLED HOLDER FOR MOUNTING PART ON INTERNAL COMBUSTION ENGINE

[75] Inventor: Hidekazu Fujimoto, Motosu-gun, Japan

[73] Assignee: Denso Corporation, Japan

[21] Appl. No.: 08/890,664

[22] Filed: Jul. 9, 1997

[30] Foreign Application Priority Data

Jul. 10, 1996 [JP] Japan .................................. 8-180912

[51] Int. Cl.⁷ .................................................. F02P 7/067
[52] U.S. Cl. ........................................... 73/866.5; 73/116
[58] Field of Search .......................... 73/866.5, DIG. 3, 73/116, 117.2, 117.3, 118.1; 324/378, 388, 391, 160, 173

[56] References Cited

U.S. PATENT DOCUMENTS

| | | | |
|---|---|---|---|
| 4,688,437 | 8/1987 | Becker et al. | 73/866.5 |
| 4,760,749 | 8/1988 | Groleau | 73/866.5 |
| 5,018,384 | 5/1991 | Hayashi et al. | 73/866.5 |
| 5,018,397 | 5/1991 | Matich | 73/866.5 |
| 5,325,734 | 7/1994 | Jordan | 73/866.5 |
| 5,546,804 | 8/1996 | Johnson et al. | 73/866.5 |
| 5,637,814 | 6/1997 | Timmons et al. | 73/866.5 |

FOREIGN PATENT DOCUMENTS

| | | |
|---|---|---|
| 52-26608 | of 0000 | Japan . |
| 63-140868 | of 0000 | Japan . |
| 63-140869 | of 0000 | Japan . |

*Primary Examiner*—George Dombroske
*Attorney, Agent, or Firm*—Nixon & Vanderhye PC

[57] ABSTRACT

An angled holder for mounting thereon a pickup coil for detecting rotational angles of a crank shaft of an internal combustion engine is composed of a base portion, a bent portion and a reinforcing portion connecting the both of the base and bent portions. The reinforcing portion serves to suppress an excessive stress imposed on a bending line along which the base and bent portions are bent due to high vibration of the engine. Accordingly, the angled holder having the reinforcing portion can withstand high vibration and its damage or breakage due to the engine vibration is prevented. Output signals from the pickup coil mounted on the angled holder are accurate and stable because the pickup coil is positioned accurately against the engine. The angled holder is made of a metal plate by a simple presswork at a low cost.

19 Claims, 4 Drawing Sheets

ANGLED HOLDER FOR MOUNTING PART ON INTERNAL COMBUSTION ENGINE

CROSS-REFERENCE TO RELATED APPLICATION

This application is based upon and claims benefit of priority of Japanese Patent Application No. Hei-8-180912 filed on Jul. 10, 1996, the content of which is incorporated herein by reference.

BACKGROUND OF THE INVENTION

1. Field of the Invention

The present invention relates to an angled holder for mounting a part such as a pickup coil on an internal combustion engine, and more particularly to such a holder made by presswork of a metal plate and having a high strength against vibration imposed thereon from an internal combustion engine when it is mounted on the engine.

2. Description of Related Art

A holder for mounting a part on an engine is disclosed, for example, in Japanese Patent Laid-Open Publications No. Sho-63-140868 and No. Sho-63-140869. The holder disclosed is for mounting a pickup coil which detects rotational angles of a crank shaft of an engine. The holder is made by simply bending a metal plate with an angle, in most cases, with an angle of 90°. There is an problem, however, that the holder tends to be damaged or broken at a bending line along which the holder is bent by stress imposed thereon due to a high vibration of the engine.

SUMMARY OF THE INVENTION

The present invention has been made in view of the above-mentioned problem, and an object of the present invention is to provide an angled holder for mounting a part such as a pickup coil on an engine which has a high strength against vibration imposed thereon from the engine, and to provide a pickup coil assembly including such an angled holder.

According to the present invention, an angled holder is made of a metal plate by presswork as a single body having a base portion, a bent portion which is bent from the base portion along a bending line with a certain angle, e.g., 90° and a reinforcing portion connecting both of the base and bent portions. The reinforcing portion is formed along a first line extending from the bending line with a certain angle, e.g., 45°. The reinforcing portion serves to suppress an excessive stress imposed on the bending line by vibration of an engine on which the angled holder is mounted together with a part, such as a pickup coil for detecting rotational angles of an crank shaft of an internal combustion engine.

The reinforcing portion of the angled holder may be further extended along a second line extending from the first line substantially in parallel to the bending line. The reinforcing portion may be extended up to a position corresponding to a mounting hole position made in the base portion. The extended reinforcing portion further increases the holder strength against the engine vibration. The reinforcing portion may be made on either one side or both sides of the bent portion. The angled holder having the reinforcing portion made on both sides provides a higher strength against the engine vibration.

The angled holder having the reinforcing portion serves to keep a magnetic core of a pickup coil mounted on the angled holder at an accurate position, because the bent angle between the base and bent potions is kept stable against the engine vibration. Accordingly, signals derived from the pickup coil representing rotational angles of an engine crank shaft become accurate and stabilized.

Other objects and features of the present invention will become more readily apparent from a better understanding of the preferred embodiments described below with reference to the following drawings.

DETAILED DESCRIPTION OF THE PREFERRED EMBODIMENTS

Figure 1:
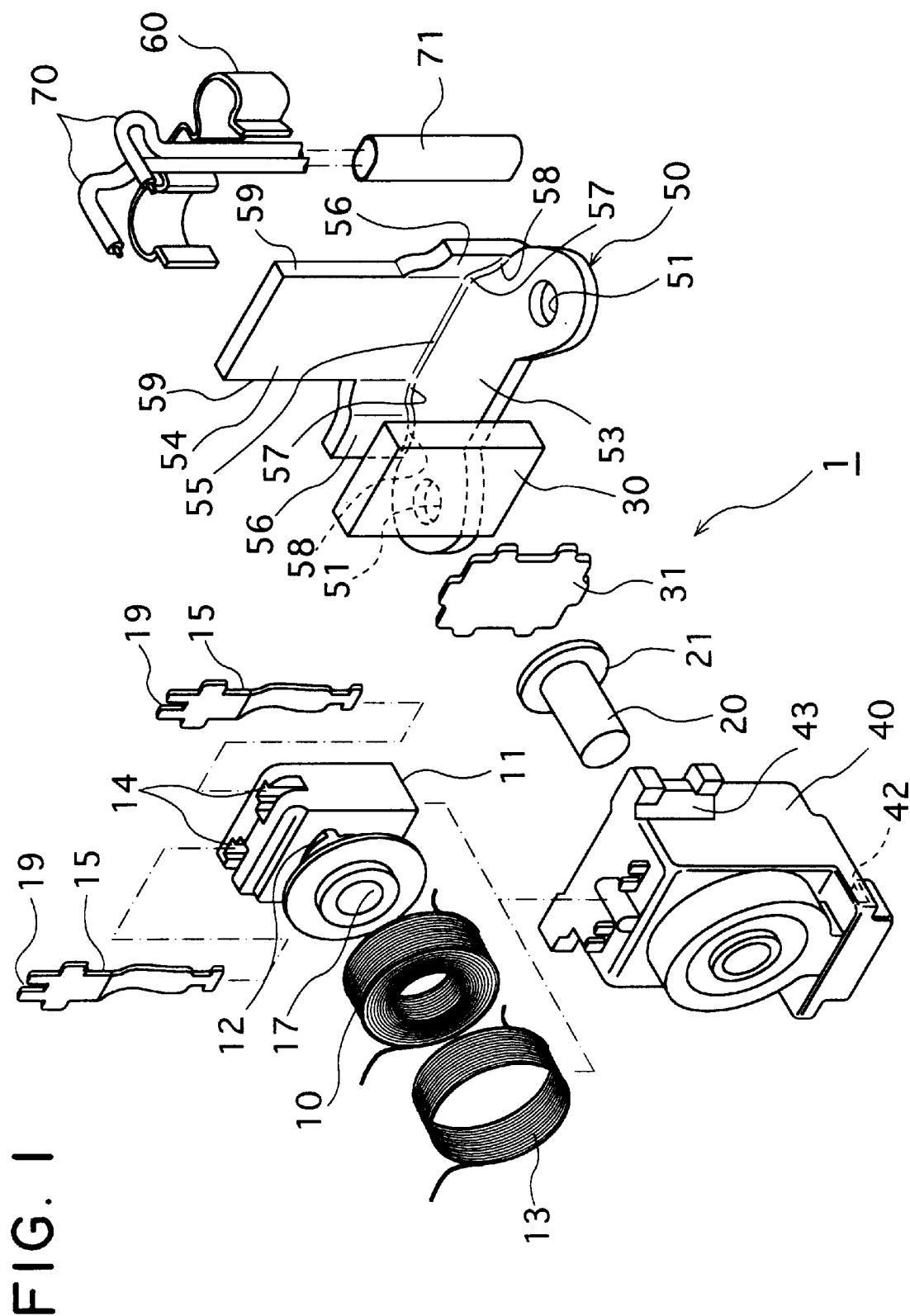
FIG. 1 is a perspective view showing parts and components used in a first embodiment of the present invention.
Figure 2:
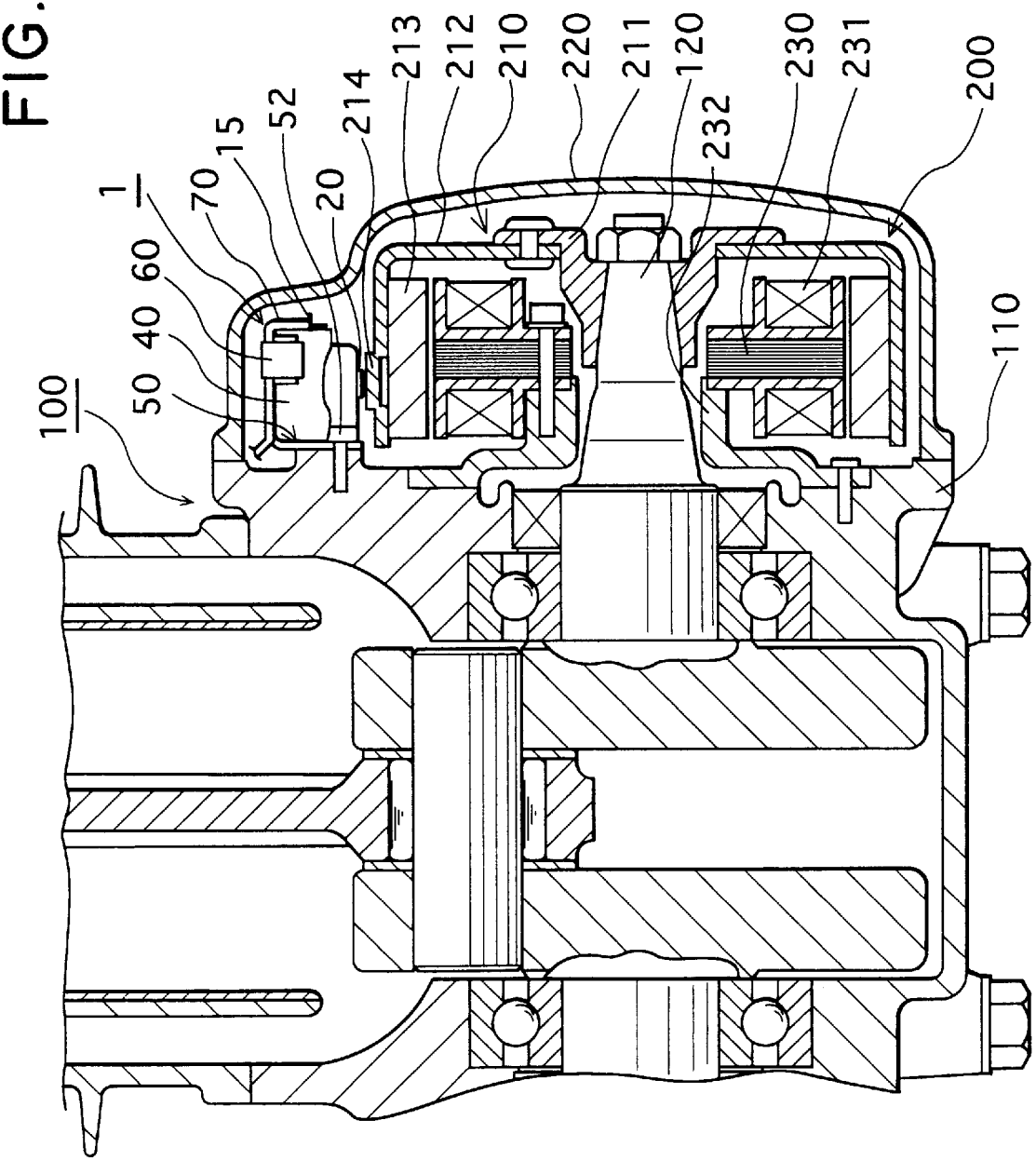
FIG. 2 is a cross-sectional view showing a part of a motorcycle engine and a generator on which a pickup coil assembly of the first embodiment according to the present invention is mounted.
Figure 3A:
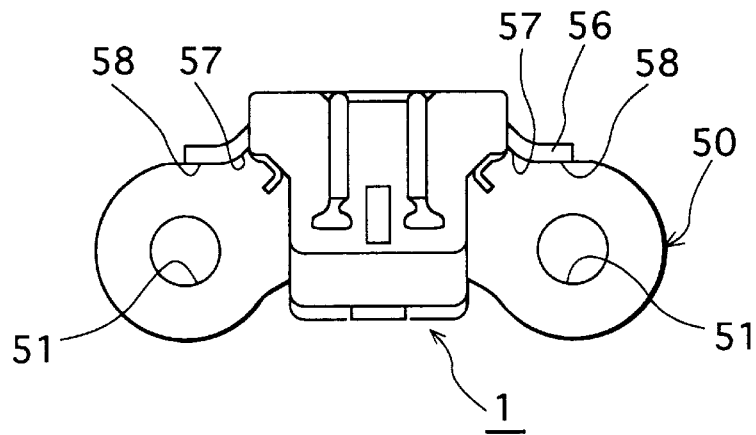
FIG. 3A is a top view of the pickup coil assembly of the first embodiment according to the present invention.
Figure 3B:
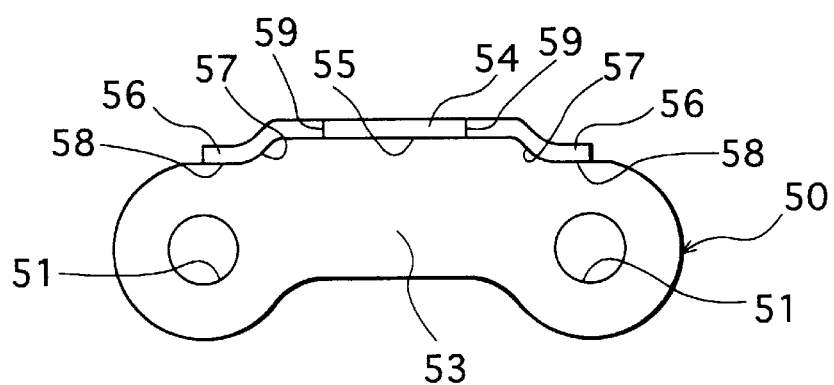
FIG. 3B is a top view of an angled holer of the first embodiment according to the present invention.

A first embodiment according to the present invention will be described referring to FIGS. 1, 2, 3A and 3B. FIG. 1 shows all parts and components disassembled from a pickup coil assembly 1 of the first embodiment. FIG. 2 shows the pickup coil assembly mounted on a motorcycle engine 100 together with a generator 200. FIG. 3A shows the pickup coil assembly 1 viewed from the top, and FIG. 3B shows the angled holder 50 used in the pickup coil assembly 1, viewed from the top.

As shown in FIG. 2, the pickup coil 1 is mounted on an axial end of a crank case 110 of the engine 100 together with the generator 200, and contained in a cover 220. The pickup coil 1 detects rotational angles of a crank shaft 120 in cooperation with a rotor assembly 210 of the generator 200. The rotor assembly 210 is composed of a rotor 212, a center boss 211 fixed to the rotor 212, and a permanent magnet 213 mounted on an inside surface of the rotor 212. The rotor assembly 210 is mounted on the crank shaft 120 so that it rotates together with the crank shaft 120. On an outer periphery of the rotor 212, a projection 214 is formed to face a magnetic core 20 of the pickup coil assembly 1. A stator 230 having an armature coil 231 wound thereon is disposed inside the rotor assembly 210, and fixedly mounted on the crank case 110 via a stator support 232. As the rotor assembly 210 rotates, alternating current is generated in the armature coil 231.

As shown in FIG. 1, the pickup coil assembly 1 is composed of a coil 10, a magnetic core 20, a permanent magnet 30 and other components all mounted together on an angled holder 50 by a fastener 60. The coil 10 is wound on a winding space 12 of a bobbin case 11, and threads 13 for protecting the coil 10 is wound on the outer surface of the coil 10. A pair of terminal holes 14 are formed in the bobbin case 11 into which a pair of terminals 15 are inserted. The bobbin case 11 has a hole 17 in which the magnet core 20 is disposed. After assembling the coil 10, the threads 13 and the terminals 15 on the bobbin case 11, all are molded in one piece by molding resin 40. On the back of the molding resin, a space for accommodating the permanent magnet 30 is formed. Into the molded piece, the magnet core 20 having a flange 21 on its back end is inserted through the hole 17. Then, a magnet plate 31 and the permanent magnet 30 are mounted on the back of the molded piece. The angled holder 50 made of an iron plate by presswork, having a base portion 53, a bent portion 54 and a reinforcing portion 56 connecting the base and bent portions, is assembled on those components from the back side thereof by a fastener 60. A base portion 53 of the angled holder 50 is inserted into a recess 42 formed on the bottom of the molded piece 40. Lead wires 70 protected by an insulating tube 71 are supported between the bent portion 54 and the fastener 70, and ends of the lead wires 70 are connected by soldering to recesses 19 made on the terminals 15 which stick out from the molded piece 40.

The pickup coil assembly 1 thus made is mounted on the crank case 110 by screws 52 inserted through mounting holes 51 formed on the base portion 53 of the angled holder 50, as shown in FIG. 2. The magnetic core 20 faces the projection 214 made on the outer periphery of the rotor 212, and a magnetic circuit is constituted by the magnetic core 20, the projection 214, the rotor 212, the angled holder 50 and the permanent magnet 30.

Referring to FIGS. 1 and 3B, details of the angled holder 50 will be described. The angled holder 50 is made of an iron plate into a single body by presswork. It has the base portion 53, the bent portion 54 which is bent along a bending line 55 from the base portion 53 with a certain angle, perpendicularly to the base portion in this particular embodiment, and a pair of the reinforcing portions 56 made on both sides of the bent portion 54 so that the reinforcing portions 56 connect the base and the bent portions to increase strength of the angled holder 50 against vibration. As shown in the drawings, the reinforcing portion 56 includes a portion made along a first line 57 extending from the bending line 55 inwardly toward the mounting hole 51 with an angle of about 45° and a portion made along a second line 58 which is parallel with the bending line 55. The outer end of the reinforcing portion 56 is extended to a position corresponding to the center of the mounting hole 51.

Figure 4:
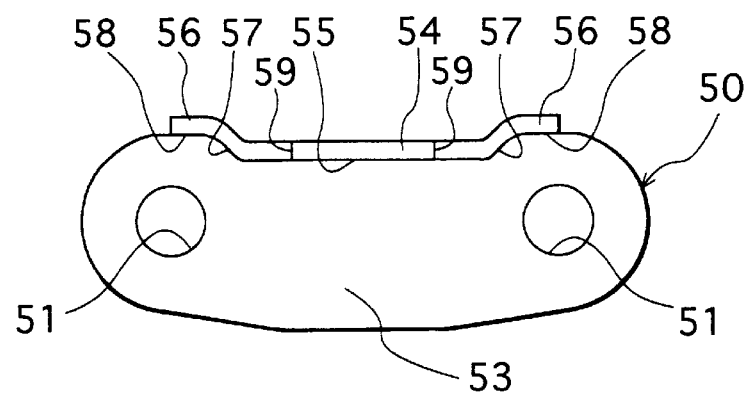
FIG. 4 is a top view showing a modified form of the angled holder shown in FIG. 3B.

FIG. 4 shows a modification of the angled holder 50 shown in FIG. 3B. In the angled holder shown in FIG. 4, the first line 57, along which a part of the reinforcing portion 56 is made, is bent outwardly from the bending line 55 with an angle of about 45°, as opposed to the first line 57 shown in FIG. 3B which is bent inwardly from the bending line 55. This modification is made so that the shape of the angled holder 50 may not interfere with other components and fits to a mounting space for the pickup coil assembly 1.

Referring to FIG. 2 again, operation of the pickup coil 1 will be described. As the crank shaft 120 rotates, the rotor 212 rotates accordingly. When the projection 214 of the rotor 212 does not face the magnetic core 20 of the pickup coil assembly 1, a magnetic circuit of the permanent magnet 30 is open. When the projection 214 faces the magnetic core 20, the magnetic circuit of the permanent magnet 30 is closed via the magnetic core 20, the projection 214, the rotor 212 and the angled holder 50. According to the opening and closing of the magnetic circuit, electric power is induced in the coil 10 which serves as a signal representing a rotational angle of the crank shaft 120. An electronic control unit (not shown) performs ignition timing setting according to the signal from the pickup coil assembly.

The angled holder 50 described above has the base portion 53 which is mounted on the end surface of the crank case 110 and the bent portion 54 which is bent from the base portion 53 with a certain angle, and further a pair of reinforcing portions 56, made on both sides of the bent portion 54, which connects both portions 53 and 54 and reinforces strength of the angled holder 50. The reinforcing portion 56 is formed at least along the first line 57 or may be formed along both of the first and second lines 57 and 58. Since the angled holder 50 is reinforced by the reinforcing portion 56, stress imposed concentratedly on the bending line 55 of the angled holder 50 due to high level of vibration of an engine is relieved. A peak level of vibration imposed on the bent portion 54 is also suppressed by the reinforcing portion 56.

The angled holder 50 is made of a metal plate by simple presswork into a single body. Therefore, fabrication of the angled holder is quite easy. Since the two portions 53 and 54 are connected by the reinforcing portion 56, spring-back of the two portions after bending process can be minimized. Accordingly, the angled holder can be made with a high dimensional accuracy, and a gap between the magnetic core 20 and the projection 214 of the rotor 212 can be maintained with accuracy, which results in obtaining stable signals from the pickup coil.

Figure 5:
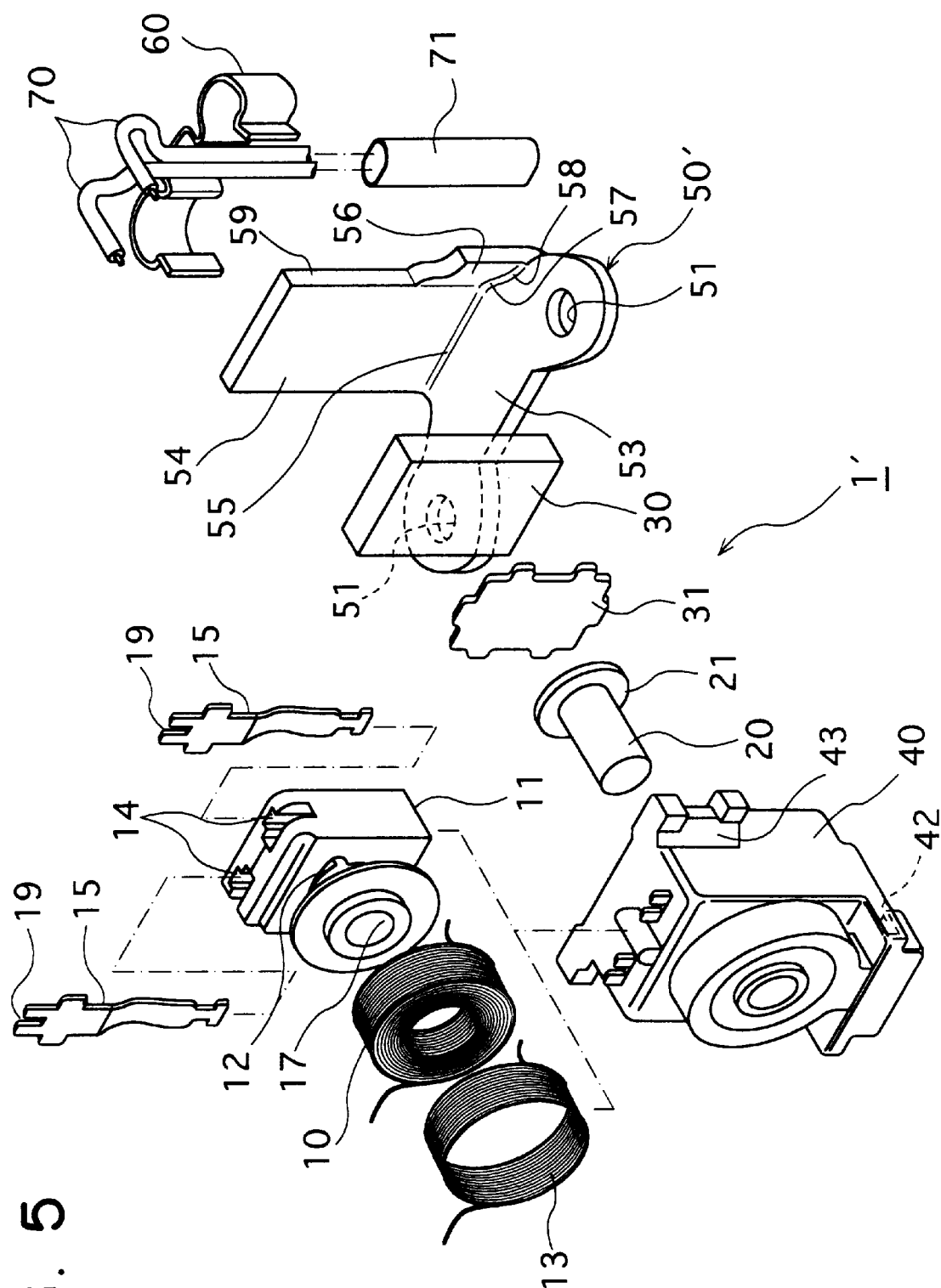
FIG. 5 is a perspective view showing parts and components used in a second embodiment according to the present invention.

FIG. 5 shows a perspective view of parts and components used in a second embodiment according to the present invention. In FIG. 5, only an angled holder 50' is different from that of the first embodiment and other parts and components are the same as those of the first embodiment.

Operation of a pickup coil assembly 1' of the second embodiment is also the same as that of the first embodiment. The angled holder 50' has a base portion 53 and a bent portion 54 both of which are the same as those of the angled holder 50 of the first embodiment, but a reinforcing portion 56 is formed on only one side of the bent portion 54 as opposed to that formed on both sides of the bent portion 54 in the first embodiment. The bent portion 56 formed on one side in this embodiment is made in the same manner as in the first embodiment, that is, a portion thereof is made along the first line 57 and another portion is made along the second line 58.

Though the strength against engine vibration of the angled holder 50 having two reinforcing portions as in the first embodiment is higher than that of the second embodiment, the angled holder 50' of the second embodiment is also useful when such a high strength is not required. Advantages or merits of the second embodiment are the same as those of the first embodiment.

The angled holder having a high strength against the engine vibration is described to be used for mounting a pickup coil in the foregoing specification. The angled holder according to the present invention, however, is not limited to such a use but may be used for other purposes for suppressing stress imposed thereon by vibration of an internal combustion engine.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An angled holder for mounting a part on an internal combustion engine, comprising:

a base portion to be mounted on the engine;

a bent portion for mounting the part thereon bent from the base portion along a bending line at a first certain angle;

a reinforcing portion connected to both said base and bent portions for suppressing stress from being imposed on the bending line by vibration of the engine, the reinforcing portion being formed at least along a first line extending from the bending line at a second certain angle; and wherein said part comprises a pick up coil disposed on the holder for mounting to the engine, said pick up coil including at least a permanent magnet, a magnetic core and a coil, for detecting a rotational angle of a crank shaft of the engine, wherein said base portion has a width greater than a width of said bent portion, wherein mounting holes are formed in the base portion laterally with respect to said bent portion so as to be disposed beyond lateral side edges of said bent portion, and wherein said reinforcing portion extends from a lateral side edge of said bent portion to a position adjacent a respective mounting hole.

2. An angled holder according to claim 1, wherein the reinforcing portion is further extendedly formed along a second line, which is substantially parallel to the bending line, extending from the first line.

3. An angled holder according to claim 1, wherein the reinforcing portion is formed on one side of the bent portion.

4. An angled holder according to claim 1, wherein the bent portion is disposed perpendicularly to the base portion such that said first certain angle is 90°.

5. An angled holder according to claim 1, wherein said first line extends from the bending line at a second certain angle of about 45°.

6. An angled holder according to claim 1, wherein said bent portion has an inward face and an outward face, wherein said base portion extends inward from said inward face at said first certain angle, and wherein lateral portions of said base portion in which said mounting holes are formed extend partially outwardly with respect to the bending line, whereby said first line extends outwardly from said bending line at said second certain angle.

7. An angled holder according to claim 6, wherein said second certain angle is about 45°.

8. A pickup coil assembly, for detecting a rotational angle of a crank shaft of an internal combustion engine, comprising:

a pickup coil having at least a permanent magnet, a magnetic core and a coil wound around a magnetic circuit formed by the permanent magnet and the magnetic core; and an angled holder, for mounting the pickup coil thereon; wherein:

the angled holder comprises a base portion to be fixed to the engine; a bent portion for mounting the pickup coil thereon which is bent from the base portion along a bending line at a first angle; and a reinforcing portion, connected to both said base and bent portions, which is formed at least along a first line extending from the bending line at a second angle;

wherein said base portion has a width greater than a width of said bent portion, wherein mounting holes are formed in the base portion laterally with respect to said bent portion so as to be disposed beyond lateral side edges of said bent portion and wherein said reinforcing portion extends from a lateral side of said bent portion to a position adjacent a respective mounting hole.

9. A pickup coil assembly according to claim 8, wherein the reinforcing portion is further extendedly formed along a second line which is extending from the first line and substantially parallel to the bending line.

10. A pickup coil assembly according to claim 8, wherein the angled holder is formed as a single body from a metal plate by presswork.

11. A pickup coil assembly according to claim 9, wherein the reinforcing portion formed along said second line extends to a position facing the mounting hole.

12. A pickup coil assembly according to claim 8, wherein the bent portion is disposed perpendicularly to the base portion such that said first angle is 90°.

13. A pickup coil assembly according to claim 8, wherein said first line extends from the bending line at a second angle of about 45°.

14. A pickup coil assembly according to claim 8, wherein said bent portion has an inward face and an outward face, wherein said base portion extends inward from said inward face at said first angle and wherein lateral portions of said base portion in which said mounting holes are formed extend partially outwardly with respect to the bending line, whereby said first line extends outwardly from said bending line at said second angle.

15. A pickup coil assembly according to claim 14, wherein said second angle is about 45°.

16. An angled holder according to claim 4, wherein a said reinforcing portion is formed to extend from each lateral side of the bent portion.

17. A pickup coil assembly, for detecting a rotational angle of a crank shaft of an internal combustion engine, comprising:

a pickup coil having at least a perm anent magnet, a magnetic core and a coil wound around a magnetic circuit formed by the permanent magnet and the magnetic core; and an angled holder, for mounting the pickup coil thereon; wherein:

the angled holder comprises a base portion to be fixed to the engine; a bent portion for mounting the pickup coil thereon which is bent from the base portion along a bending line at a certain angle so as to have an inward face facing said engine and an outward face; and a reinforcing portion, connected to both said base and bent portions, which is formed at least along a first line extending from the bending line at an angle of about 45°;

wherein said base portion has a width greater than a width of said bent portion, whereby said base portion has lateral portions extending beyond lateral side edges of said bent portion, wherein at least one mounting hole is formed in each said lateral portion of said base portion so as to be disposed beyond said lateral side edges of said bent portion, and wherein said reinforcing portion extends from a lateral side edge of said bent portion to a position adjacent a respective mounting hole.

18. A pickup coil assembly according to claim 17, wherein said lateral portions project partially outwardly with respect to said bent line and said first line extends outwardly from said bending line at an angle of about 45°.

19. A pickup coil assembly according to claim 18, wherein the reinforcing portion is further extended along a second line which extends from the first line and is substantially parallel to the bending line.

* * * * *